(12) United States Patent
Neese

(10) Patent No.: US 7,425,773 B1
(45) Date of Patent: Sep. 16, 2008

(54) WAVE-POWERED GENERATOR

(76) Inventor: Stephen L. Neese, 3925 E. 9th Ave., Apt. #5, Anchorage, AK (US) 99508

( * ) Notice: Subject to any disclaimer, the term of this patent is extended or adjusted under 35 U.S.C. 154(b) by 0 days.

(21) Appl. No.: 11/701,936

(22) Filed: Feb. 3, 2007

Related U.S. Application Data

(63) Continuation of application No. 11/231,019, filed on Sep. 20, 2005, now abandoned.

(51) Int. Cl.
*F03B 13/00* (2006.01)
(52) U.S. Cl. ........................................................ 290/53
(58) Field of Classification Search .................. None
See application file for complete search history.

(56) References Cited

FOREIGN PATENT DOCUMENTS

GB        2404699 A   *   2/2005

* cited by examiner

*Primary Examiner*—Joseph Waks
(74) *Attorney, Agent, or Firm*—Michael J. Tavella

(57) ABSTRACT

A "wave mill" that is adapted from modern windmill designs. The wave mill has a long vertical shaft, positioned in the sea and secured to the seabed. The mill has a number of long blades (arms) that have hinged fins attached. The number of these fins depends upon the change in tides. Adding more fins ensures that the mill will operate at all tidal levels in a given area. The wave mill does operate with the wind. Therefore, it does not rotate to follow changing wind conditions. Several arms are needed for maximum generation efficiency. To provide stability for the structure, supports are placed on the sides of the structure. The structures use large rings to brace the arms against strong crosswinds. The arms are connected at a central hub, which has shafts extending from both sides. The shafts connect to bearings and to a generator.

6 Claims, 4 Drawing Sheets

WAVE-POWERED GENERATOR

CROSS REFERENCE TO RELATED APPLICATIONS

This application is a continuation of application Ser. No. 11/231,019 filed Sep. 20, 2005 now abandoned.

STATEMENT REGARDING FEDERALLY SPONSORED RESEARCH AND DEVELOPMENT

Not Applicable

BACKGROUND OF THE INVENTION

1. Field of the Invention

This invention relates to a wave-powered generator and particularly to a wave powered generator using a windmill configuration.

2. Description of the Prior Art

Water-powered generators have been in use for centuries, going back to the old waterwheels used to power mills. In recent years, a surge of interest in using tidal surges and wave action to generate power has grown. Many modern wave-operated systems use floats attached to reciprocating devices that rise and fall with the ocean swells. These in turn, drive generators to produce power. Although these devices work, they require considerable surface area to lay out the pattern of floats to generate sufficient power. Moreover, they require anchoring systems for all of the floats. Finally, the number of machines creates a large maintenance burden.

BRIEF DESCRIPTION OF THE INVENTION

The instant invention overcomes these problems. It is a "wave mill" that is adapted from modern windmill designs. The wave mill has a long vertical shaft, positioned in the sea and secured to the seabed. The mill has a number of long blades (arms) that have hinged fins attached. The number of these fins depends upon the change in tides and the flow. Adding more fins ensures that the mill will operate at all tidal levels in a given area. The wave mill does not operate with the wind. Therefore, it does not rotate to follow changing wind conditions. Several arms are needed for maximum generation efficiency.

The arms are connected at a central hub, which has shafts extending from both sides. The shafts connect to bearings and gearboxes, as needed, and eventually to a generator. To provide stability for the structure, supports are placed on the sides of the structure. The structures support the bearings for the main shaft of the mill as well as large rings that brace the arms against strong crosswinds.

At the ends of the arms are hinged fins. The hinges are used to reduce drag in the water and in the air. As the fin enters the water, it opens to allow the maximum water pressure to act on it. As the next fin enters the water in turn, the water pressure on the first fin is reduced. The fin then folds to reduce the drag as it continues to move through the water. The folding action applies to each of the fins, in turn, as they revolve around the hub through the water.

DETAILED DESCRIPTION OF THE INVENTION

Figure 1:
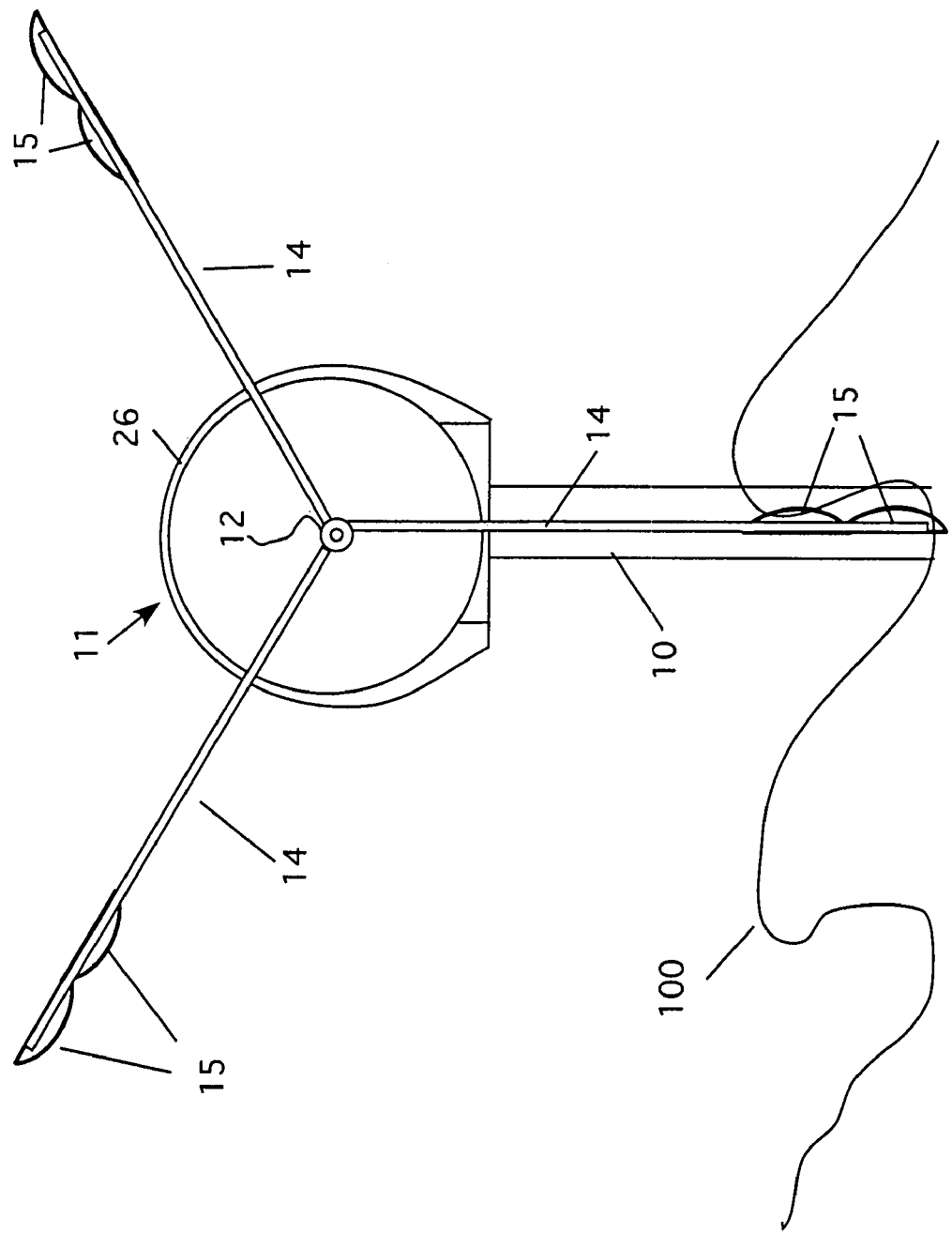
FIG. 1 is a side view of the invention showing three arms.
Figure 4:
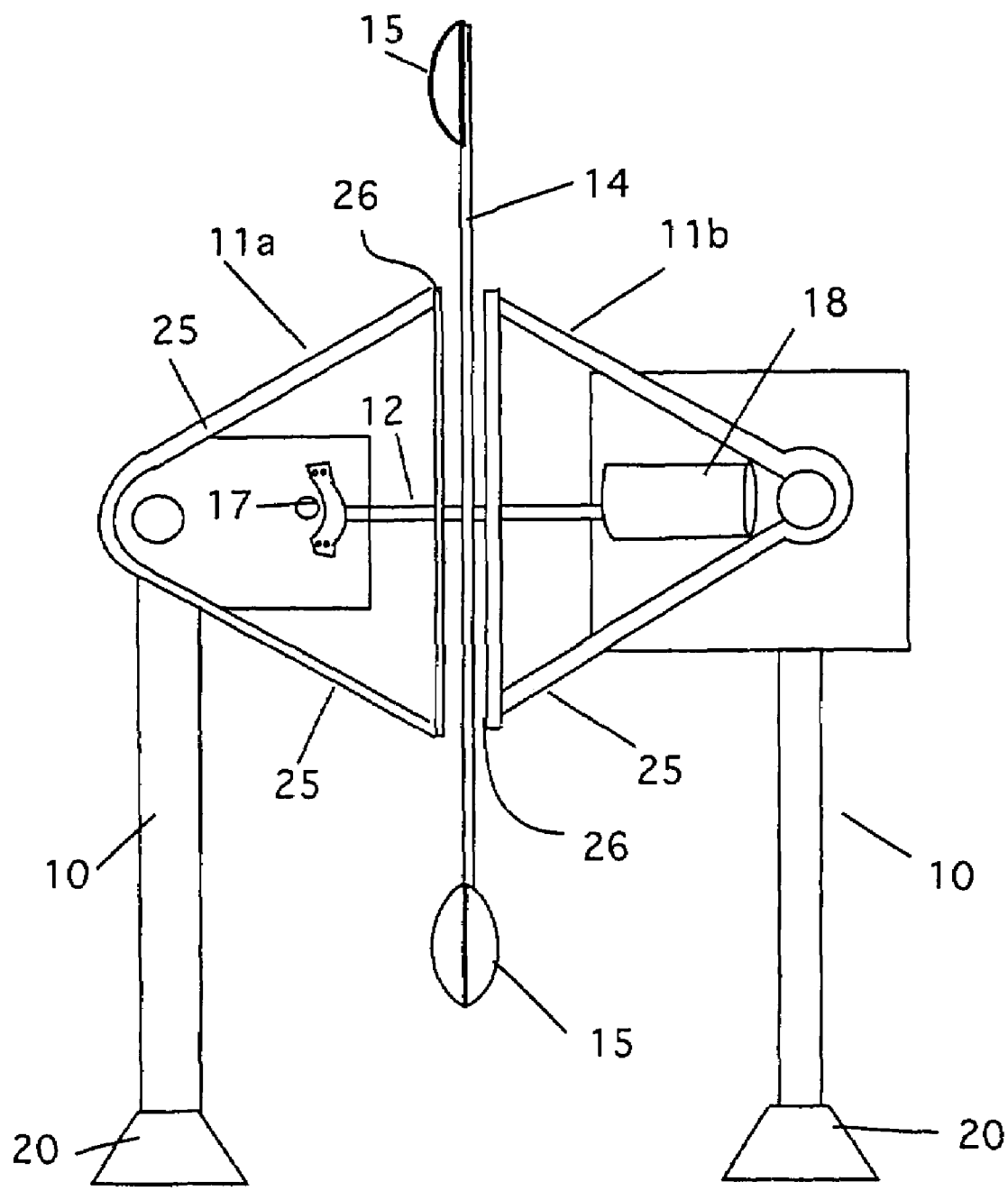
FIG. 4 is front view of the assembled device showing the attached gearboxes, generators and or mechanical equipment.

Referring now to FIG. 1, the basic form of the invention 1 is shown. Here, the "wave mill" has a support post 10 a support frame 11 (note that in this view only one side of the frame is shown for clarity—the entire frame is shown in FIG. 4, as discussed below) that has a bearing to support the shaft 12. The post is set into moving water 100 and is secured in place using common means known in the art.

In FIG. 1, here arms 14 are attached to a hub 13, which is attached to the shaft 12 using ordinary methods.

The arms 14 are thin and designed to present little resistance to air or to the water. At the end of each arm is a pair of hinged blades 15. The blades 15 are designed to fold from an open position to a closed position as the mill turns.

Figure 2:
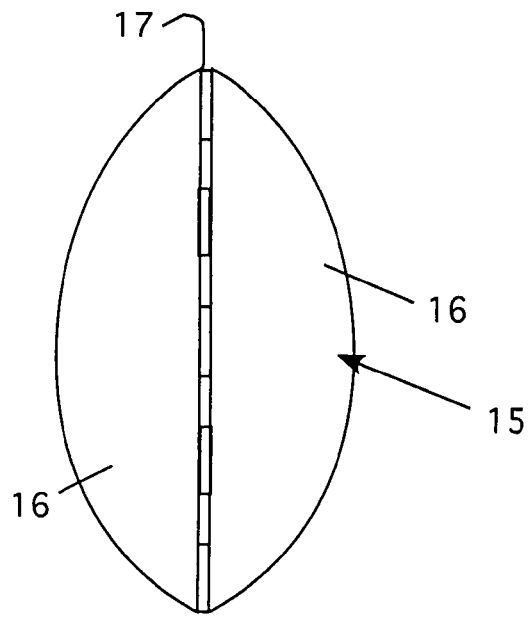
FIG. 2 is a detail view of a hinged blade in the open position.

FIG. 2 is a detail view of a hinged blade 15 in the open position. Here, the blade has two curved pieces 16 that are connected by a hinge 17. In the open position, the blades present a flat surface upon which water impinges. This produces the maximum force on the blades, which in turn translates to maximum force on any mechanical device being driven by the mill. The fins are designed to close due to gravity, water pressure and wind. Initially, the blade is closed as it enters the water. When the water pressure on the face of the blade increases, the blade opens to a flat surface. This allows the greatest amount of water pressure to impinge on the blade. As the next blade enters the water, it too opens. Once this happens, the force on the trailing blade drops. Drag from behind then forces the trailing blade to close. It remains closed when it leaves the water. In this way, the maximum force is achieved with minimal losses due to drag on the other blades.

Figure 3:
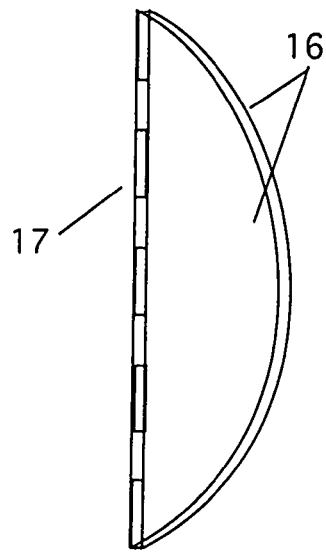
FIG. 3 is a detail view of a hinged blade in the closed position.

FIG. 3 is a detail view of a hinged blade in the closed position. Here, the hinge 17 has closed the curved portions. This closed configuration presents the minimum resistance in the air and in the water. In this way, little energy is lost when the mill's arms are out of the water.

Figure 2A:
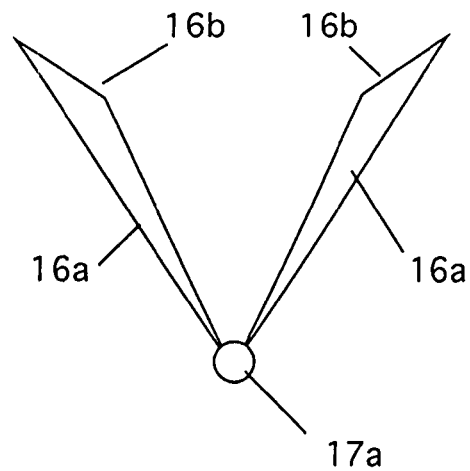
FIG. 2a is a top view of the preferred embodiment of the hinged blade in a partially open position.
Figure 3A:
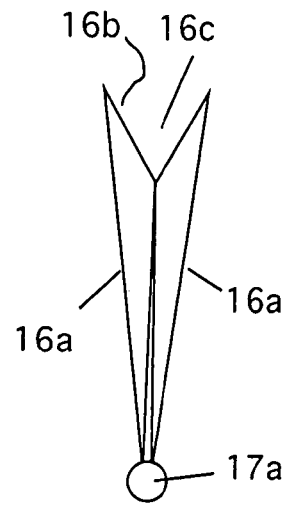
FIG. 3a is a top view of the preferred embodiment of the hinged blade in the closed position

FIG. 2a is a top view of the preferred embodiment blade design in a partially opened position. Here, the curved pieces 16a have angled faces 16b as shown. The hinge 17a is as before. In FIG. 3a, the blade is closed. Here, the advantage of the angled tops 16b is seen. When closed. The blades form a "V" channel 16c as shown. This "V" channel helps force the blade open when it enters the water to ensure that the blade reaches maximum effectiveness.

FIG. 4 is front view of the assembled device showing the attached transmission (e.g., gearboxes), generators and or mechanical equipment. In this view, the arms 14 re positioned about the shaft 12, which is attached to the frames 11a and 11b. This view also shows the support posts 10 and the anchors 20 that hold the posts on the bottom of the body of water. Frame 11a shows a bearing support 17 for the shaft 12. Frame 11b shows a generator, gearbox and/or other mechanical device 18 to which the other end of the shaft 12 is secured.

The frames have support arms 25 that extend from the frames toward the arms 14. The support arms have large circular supports 26 attached at their ends (see also FIG. 1).

The circular supports 26 acts to keep the device stable in windy conditions or in times of heavy crosscurrents. If the arms 14 are deflected in these conditions, the circular supports limit the amount of lateral movement of the arms 14.

Figure 5:
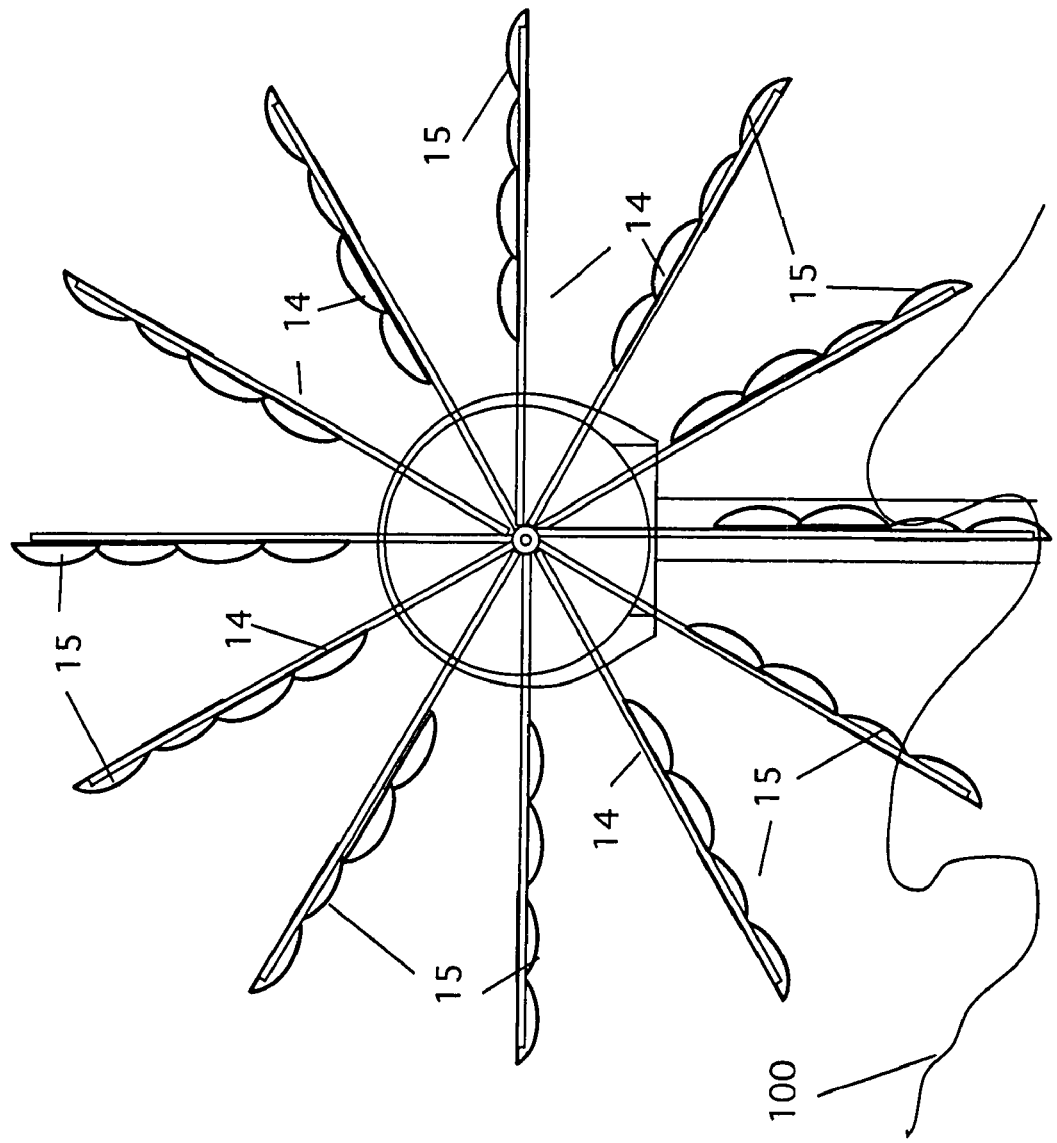
FIG. 5 is a side view of the invention showing twelve arms.

FIG. 1 shows three arms 14 on the device. This is done mostly for simplicity of the drawings and for clarity of the basic design. However, in the preferred embodiment, additional arms are needed to ensure adequate movement and force is developed. FIG. 5 is a side view of the invention showing twelve arms. With twelve arms, the invention can generate several times the power of the three-arm device. Of course, other arm arrangements can be used as well, with fewer or more arms as desired. Note that in this embodiment, four sets of collapsible blades are positioned on each arm. This is done to ensure that the device works in normal tidal action, where the sea level rises and falls in normal cycles. Because the support post is fixed, the arms cannot adjust up and down for these tidal flows. Adding more blades to the arms ensures that the mill will turn under all tidal conditions. Of course, although four sets of blades are shown, that number can be increased, if needed.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A water mill comprising:
  a) a support post, said support post being positioned in a moving body of water;
  b) a hub, rotatably attached to said support post;
  c) a plurality of arms, each of said plurality of arms having a proximate end and a distal end, and further wherein the proximate end of each of said plurality of arms is attached to said hub such that said plurality of arms extends outward radially from said hub such that said plurality of arms are positioned in a plane parallel to said support post, and further wherein the distal end of each of said plurality of arms is independent of the others of said plurality of arms;
  d) at least one collapsible blade, being installed on each of said plurality of arms such that said blade is in longitudinal alignment with said arm, wherein the at least one collapsible blade includes:
    i) a first blade portion;
    ii) a second blade portion, being oppositely disposed from said first blade portion; and
    iii) a hinge, attached to said first and second blade portions;
  e) wherein the at least one collapsible blade has an open position and a closed position
  f) and further wherein the first blade portion and the second blade portion each has an angled outer end form a "V" channel when said at least one blade is in a closed position;
  g) a shaft, attached to said hub; and
  h) a generator, attached to said shaft.

2. The water mill of claim 1 further comprising a transmission system, operably installed on said shaft between said hub and said generator.

3. A water mill comprising:
  a) a support post, said support post being positioned in a moving body of water;
  b) a hub, rotatably attached to said support post;
  c) a plurality of arms, each of said plurality of arms having a proximate end and a distal end, and further wherein the proximate end of each of said plurality of arms is attached to said hub such that said plurality of arms extends outward from said hub such that said plurality of arms are positioned in a plane parallel to said support post, and further wherein the distal end of each of said plurality of arms is independent of the others of said plurality of arms;
  d) a pair of collapsible blades, being installed on the distal end of each of said plurality of arms such that said pair of collapsible blades is in longitudinal alignment with said arm wherein each of said pair of collapsible blades includes:
    i) a first blade portion;
    ii) a second blade portion, being oppositely disposed from said first blade portion; and
    iii) a hinge, attached to said first and second blade portions;
  e) wherein each of said pair of collapsible blades has an open position and a closed position
  f) and further wherein the first blade portion and the second blade portion each has an angled outer end form a "V" channel when each of aid collapsible blades is in a closed position;
  g) a shaft, attached to said hub; and
  h) a generator, attached to said shaft.

4. The water mill of claim 3 further comprising a transmission system, operably installed on said shaft between said hub and said generator.

5. A water mill comprising:
  a) a support post, said support post being positioned in a moving body of water;
  b) a hub, rotatably attached to said support post;
  c) a plurality of arms, each of said plurality of arms having a proximate end and a distal end, and further wherein the proximate end of each of said plurality of arms is attached to said hub such that said plurality of arms extends outward radially from said hub such that said plurality of arms are positioned in a plane parallel to said support post, and further wherein the distal end of each of said plurality of arms is independent of the others of said plurality of arms;
  d) a plurality of collapsible blades, being installed on the distal end of each of said plurality of arms such that said plurality of collapsible blades is in longitudinal alignment with said arm wherein each of said plurality of collapsible blades includes:
    i) a first blade portion;
    ii) a second blade portion, being oppositely disposed from said first blade portion; and
    iii) a hinge, attached to said first and second blade portions;
  e) wherein each of said pair of collapsible blades has an open position and a closed position
  f) and further wherein the first blade portion and the second blade portion each has an angled outer end form a "V" channel when each of aid collapsible blades is in a closed position;
  g) a shaft, attached to said hub; and
  h) a generator, attached to said shaft.

6. The water mill of claim 5 further comprising a transmission system, operably installed on said shaft between said hub and said generator.

* * * * *